UNITED STATES PATENT OFFICE.

EMIL COLLETT, OF CHRISTIANIA, NORWAY, ASSIGNOR TO NORSK-HYDROELEKTRISK KVAELSTOFAKTIESELSKAB, OF CHRISTIANIA, NORWAY.

PROCESS OF CONCENTRATING DILUTE NITRIC ACID.

1,158,181.     Specification of Letters Patent.     Patented Oct. 26, 1915.

No Drawing. Original application filed March 27, 1913, Serial No. 757,252. Divided and this application filed June 15, 1915. Serial No. 34,308.

*To all whom it may concern:*

Be it known that I, EMIL COLLETT, a subject of the King of Norway, residing at Christiania, in the Kingdom of Norway, have invented certain new and useful Improvements in Processes of Concentrating Dilute Nitric Acid; and I do hereby declare the following to be a full, clear, and exact description of the invention, such as will enable others skilled in the art to which it appertains to make and use the same.

This invention relates to the concentration of acids by boiling an acid in distillation vessels and introducing acid vapors containing moisture into a drying tower charged with a drying agent, such as concentrated sulfuric acid, which absorbs the moisture or water vapor and permits the concentrated acid vapor to escape therefrom, and is a division of my application for patent, Serial No. 757,252, filed March 27th, 1913.

By operating in the manner above described it has been found that it is difficult to regulate the temperature so that the desired concentration is obtained. The temperature is liable to rise too high, and thus allow water vapor, which should otherwise be absorbed, to escape with the acid vapors and give a too low concentration, with the accompanying loss of energy, and increased costs for further concentration.

I have found that I can reliably control the temperature in the drying tower in a very simple manner. The drying medium, sulfuric acid, for instance is usually supplied at the top of the tower in a heated condition. I then introduce a cooling medium into the tower at a lower point, which may be cold sulfuric acid, cold nitric acid, or a cold mixture of the two acids. The acid vapors to be concentrated or dried are introduced at the bottom of the drying tower. At the point or zone of the apparatus where it has been found by experience that the highest temperature prevails, or at a point below the top of the tower which by experiment has been found to be suitable, regulated quantities of the cooling agent are introduced during the drying operation. By regulating in a suitable manner the amount and temperature of the cooling agent introduced at this point the temperature in the drying apparatus can easily be maintained within the limits desired. When cold sulfuric acid is introduced at the zone of maximum temperature it absorbs heat and at the same time assists in the concentration or drying. When introducing cold nitric acid alone, this acid must have a rather high concentration for inst. about 60 per cent. in order that its content of water shall not by contact with the drying agent (sulfuric acid) evolve injurious heat and thus counteract the cooling action to be attained. This concentrated nitric acid when cold, acts as a cooling agent by absorbing heat from the hot zone, and also causes an absorption of heat by vaporization, the acid vapor mixing with and escaping with nitric acid vapors that are being concentrated. When a cold mixture of sulfuric and nitric acids is used, the combined actions of the two acids are exerted on the vapors to be dried.

Claims:

1. In the process of concentrating nitric acid vapors by absorbing moisture therefrom in an apparatus employing sulfuric acid as a drying agent, the improvement which comprises introducing concentrated nitric acid into said apparatus between the point where the vapors enter the latter and the point where the vapors escape.

2. In the process of concentrating nitric acid vapors by absorbing moisture therefrom in an apparatus employing sulfuric acid as a drying agent, the improvement which comprises introducing cold concentrated nitric acid into said apparatus between the point where the vapors enter the latter and the point where the vapors escape.

3. In the process of concentrating acid vapors by absorbing moisture therefrom in an apparatus employing a suitable drying agent, the improvement which comprises introducing, at a point below the top of the tower, into the current of the acid vapors to be dried, a vaporizable liquid that does not affect the concentration of the acid vapors.

4. In the process of concentrating acid vapors by absorbing moisture therefrom in an apparatus employing a suitable drying agent, the improvement which comprises introducing, at the zone of maximum temperature a vaporizable liquid that does not affect the concentration of the acid vapors.

In testimony that I claim the foregoing as my invention, I have signed my name in presence of two subscribing witnesses.

EMIL COLLETT.

Witnesses:
M. E. GUTTODRUSER,
C. F. HANSEN.